(12) United States Patent
Jakobsen et al.

(10) Patent No.: US 10,978,989 B1
(45) Date of Patent: Apr. 13, 2021

(54) SOLAR COLLECTION DEVICE AND METHOD

(71) Applicants: Christopher Robin Jakobsen, Milton, GA (US); Christopher David Burns, Roswell, GA (US); Raymond Lee Dickens, Roswell, GA (US)

(72) Inventors: Christopher Robin Jakobsen, Milton, GA (US); Christopher David Burns, Roswell, GA (US); Raymond Lee Dickens, Roswell, GA (US)

(73) Assignee: CNC Holdings Manufacturing LLC, Roswell, GA (US)

( * ) Notice: Subject to any disclaimer, the term of this patent is extended or adjusted under 35 U.S.C. 154(b) by 0 days.

(21) Appl. No.: 17/026,169

(22) Filed: Sep. 19, 2020

Related U.S. Application Data

(63) Continuation-in-part of application No. 16/988,588, filed on Aug. 7, 2020.

(51) Int. Cl.
| | |
|---|---|
| *H02S 10/40* | (2014.01) |
| *H02S 20/32* | (2014.01) |
| *H02S 40/38* | (2014.01) |
| *H02J 7/35* | (2006.01) |
| *B60L 8/00* | (2006.01) |

(52) U.S. Cl.
CPC .............. *H02S 10/40* (2014.12); *B60L 8/003* (2013.01); *H02J 7/35* (2013.01); *H02S 20/32* (2014.12); *H02S 40/38* (2014.12); *H02J 2300/22* (2020.01); *H02J 2310/12* (2020.01)

(58) Field of Classification Search
CPC .......... H02S 10/40; H02S 20/32; H02S 40/38; B60L 8/003; H02J 7/35; H02J 2310/12; H02J 2300/22; H02J 2300/24
See application file for complete search history.

(56) References Cited

U.S. PATENT DOCUMENTS 5,852,353 A * 12/1998 Kochanneck ............. H02J 7/32
 318/558

* cited by examiner

*Primary Examiner* — Carlos Amaya
(74) *Attorney, Agent, or Firm* — Steven C. Stewart (57) ABSTRACT

A mobile solar collecting device, system and method is disclosed. The system includes an angle adjustable solar collecting device, an electronic storage unit to store electric energy collected by the mobile solar collecting device, a first power connecter to electrically engage with a second power connector affixed to a structure to feed electricity to an electric power grid, a transport unit to move the mobile solar collecting device, a controller. The controller directs the transport unit to periodically move the adjustable solar collecting device to optimum solar collecting locations, provides an indication to adjust an orientation of the adjustable solar collecting device to obtain maximum energy from a sun, and directs the transport unit to move the mobile solar collecting device to a location where the first power connector electrically engages with the second power connector to discharge energy in the electronic storage unit to the power grid.

20 Claims, 11 Drawing Sheets

SOLAR COLLECTION DEVICE AND METHOD

BACKGROUND

This application relates to a system and method for collecting and storing solar energy. Stationary solar energy collection systems are typically mounted to a fixed structure and grounded in a single place. These systems are limited in exposure to only the exposure to the direct path sunlight. Consequently, a stationary solar energy collection system may not generate its full potential due to shade from trees or other structures blocking out sun light during the course of a day.

SUMMARY OF THE INVENTION

The disclosed system is mobile, modular, and may seek out the sun by constantly repositioning to gain maximum sun exposure based on the dynamic changes in the environment, seasonal sunlight changes, topography changes and other obstacles. The system can position one or more mobile modules based on a packet structure to deploy and organize themselves but still work as a collective. The solar system can operate less obtrusively then traditional mounted systems. It can harvest and transport electricity and then redistribute newly generate electricity to other systems. The solar system may run a machine learning algorithm that maps and gathers data Intelligence to set and achieve goals to improve productivity in collecting solar energy.

In one embodiment, a mobile solar collecting device includes an adjustable solar collecting device (e.g. an angle adjustable solar panel that converts solar energy to electrical energy) and an electronic storage unit (e.g. a battery) that stores converted electric energy collected by the solar panel. A first power connecter of the mobile solar collecting device electrically engages with a second power connector affixed to a structure to feed electricity to an electric power grid. A transport unit moves the adjustable solar panel, and a controller directs the transport unit to move the adjustable solar panel to one or more optimum solar collecting locations, adjusts an orientation of the adjustable solar panel to receive maximum solar energy from a sun and to store electric energy from the solar panel in the electronic storage unit. Controller provides a signal to direct the transport unit to move the adjustable solar panel to a location where the first power connector electrically engages with the second power connector to discharge energy stored in the electronic storage unit to the power grid.

In another embodiment, a method for collecting and storing solar energy with a mobile solar collection device that includes an adjustable solar collecting device, an electronic storage unit, a power connecter, a transport unit, and a controller is disclosed. The method includes collecting energy provided by a sun with an adjustable solar collecting device, and storing electric energy collected by the mobile solar collecting device with the electronic storage unit. The first power connecter is electrically engaged with a second power connector affixed to a structure to feed electricity to a power grid within a building. The transport unit is directed with the controller to move the adjustable solar collecting device to one or more predetermined optimum solar collecting locations. An orientation of the adjustable solar collecting device is adjusted to obtain maximum energy from the sun to store in the electronic storage unit. The transport unit is directed to move the mobile solar collecting device to a location where the first power connector electrically engages with the second power connector affixed to a structure to discharge energy in the electronic storage unit to the power grid.

In a further aspect, a system for collecting and storing solar energy includes a building with an internal power grid. A building power connector is affixed to a structure to feed electricity to the internal power grid. A first mobile solar collecting device is provided that includes an adjustable solar panel, an electronic storage unit to store electric energy collected by the mobile solar collecting device, a power connecter to electrically engage with the building power connector to feed electricity to the power grid, a motorized transport unit to move the mobile solar collecting device, and a controller. The controller directs the transport unit to move the first mobile solar collecting device away from the structure to one of a plurality of predetermined optimum solar collecting locations free from obstructions between the solar collecting device and the sun. Further the controller adjust an orientation of the adjustable solar panels to direct the transport unit to move the first mobile solar collecting device to a location where the power connector electrically engages with the power connector to discharge energy in the electronic storage unit to the power grid.

Other embodiments of this aspect include corresponding computer systems, apparatus, and computer programs recorded on one or more computer storage devices, each configured to perform the actions of the methods.

DETAILED DESCRIPTION

Figure 1:
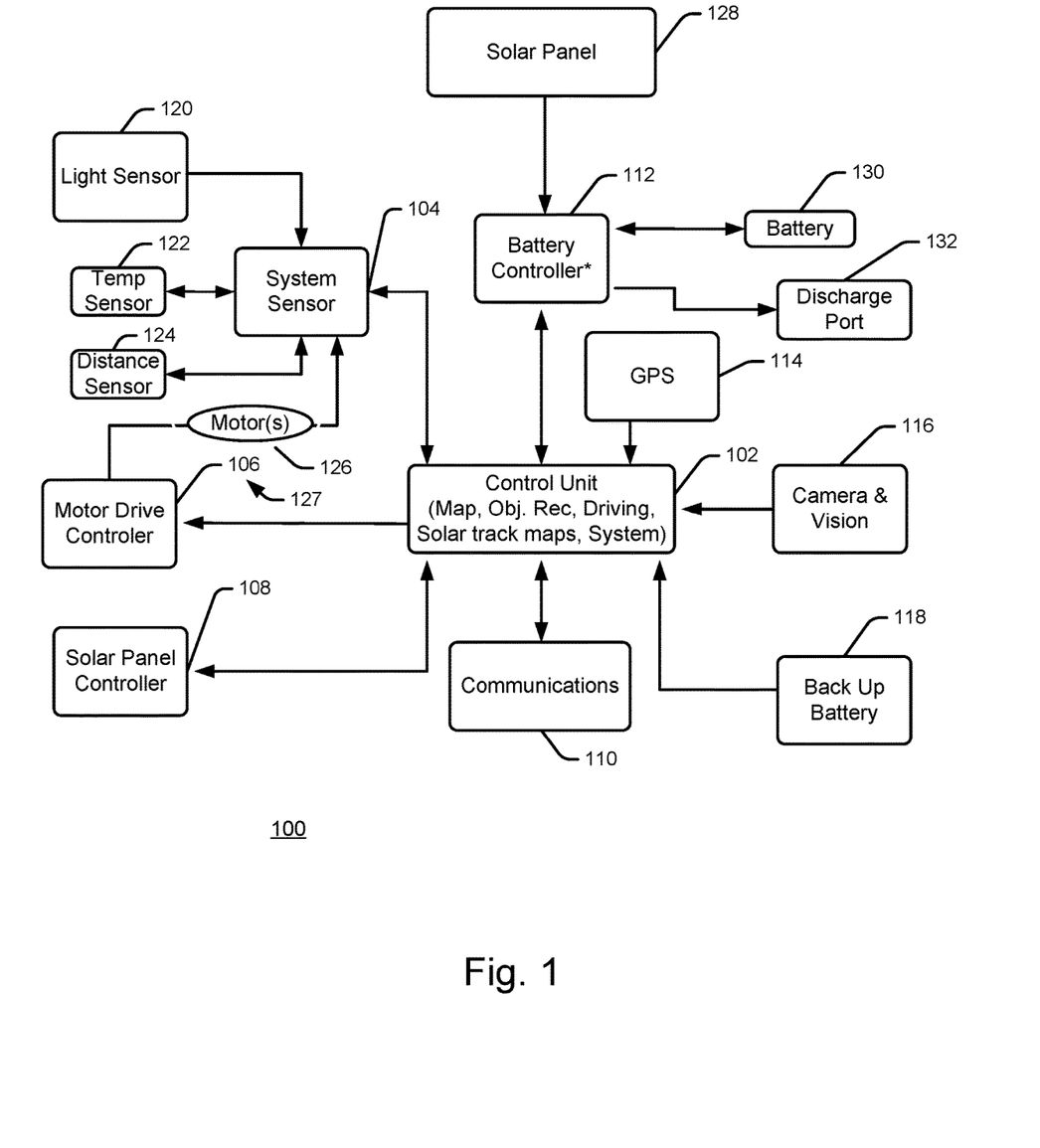
FIG. 1 is a simplified schematic diagram of a mobile solar collecting device.

Referring to FIG. 1 there is shown a semi-autonomous mobile solar collecting device 100 for collecting and discharging solar energy. In one implementation, the device 100 includes a control unit (also referred to herein as a controller) 102 coupled to a system sensor 104, a motor drive controller 106, a solar panel controller 108, a communications device 110, a battery controller 112, a Global Positioning Sensor detector 114, a camera/light sensor 116 and a backup battery 118.

Figure 8A:
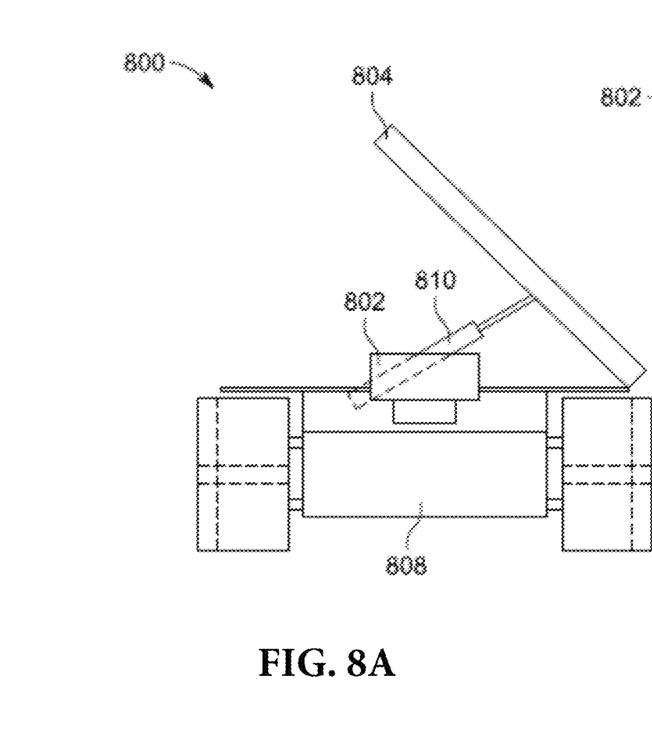
FIG. 8A-8C are front, side, and top perspective view of the device for collecting and discharging solar energy.
Figure 8B:
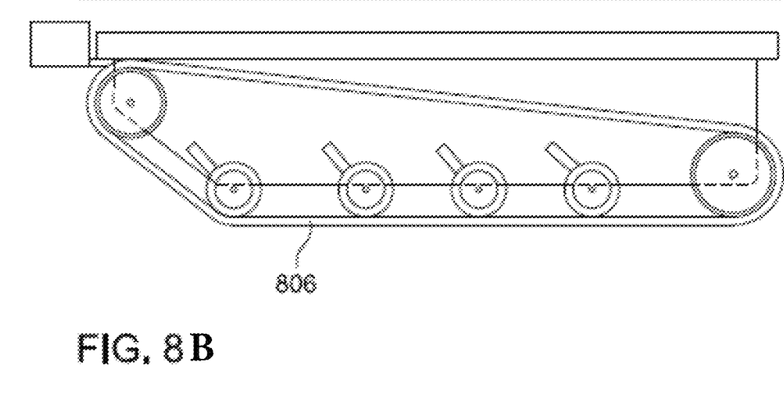
Figure 8C:
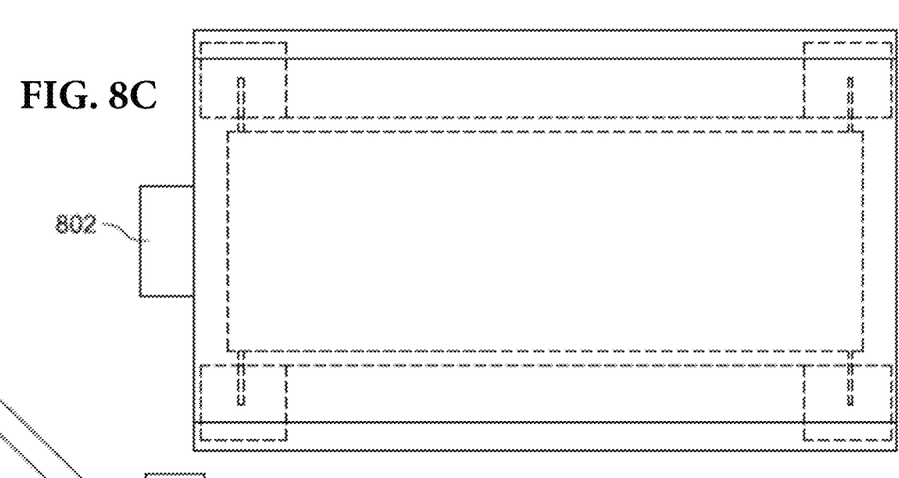

System sensor 104 is coupled to light sensor 120, temperature sensor 122, distance sensor 124, other sensors (not shown) and one or more motors 126 that moves mobile solar collecting device 100. Motor drive controller 106 is also coupled to motor 126 (collectively referred to herein as a "transport unit 127"). In one implementation the transport unit 127 has motorized wheels or a half-track (see FIG. 8). Other sensors may include surface/ground heat sensors, panel prefect pitch sensor, boundary sensor, incline decline sensors, motion sensors and charge sensors.

Battery controller 112 is coupled to an angle adjustable solar panel 128, battery 130 (also referred to herein as a "electronic storage unit") and discharge port 132 (also referred to herein as a "power connector").

Control Unit 102 via motor drive controller 106 directs the transport unit to move the mobile solar collecting device 100 to one or more optimum solar collecting locations. Preferably controller 102 is operable to provide an indication to the transport unit 127 to periodically move the mobile solar collecting device 100 away from the structure to one of many predetermined optimum solar collecting locations that are free from obstructions between the solar panel 128 of the solar collecting device 100 and a sun in a yard of a home or an office.

Control Unit 102 periodically feeds a signal to solar panel controller 108 to adjust an orientation and/or angle of solar panel 128 (also referred to herein as an orientation adjustable solar collecting device 128). In response to the signal, the adjustment may be performed by changing and/or adjusting an angular orientation of the solar collection device with respect to a horizon to obtain maximum energy from the sun at the solar collection device (e.g. panel). The collected energy may then be stored in the electronic storage unit (e.g. a battery). The control unit 102 may send the signal automatically and continuously to solar panel controller 108 to change the angle of the solar panel 128 as the angle of the sun moves in the sky during the day to maintain a maximum collection angle.

Control unit 102 directs, by sending a signal to, the transport unit 127 to move the mobile solar collecting device 100 to a location where the power connector 132 of the collecting device 100 electrically engages with the power connector 132 coupled to a structure or building to discharge energy in the electronic storage unit 130 to an electric power grid (see FIG. 11) within the structure. Preferably, the controller 102 directs the transport unit 127 to move the mobile solar collecting device 100 to the location where the power connector 132 electrically engages with the power connector of the structure (See FIG. 11) to discharge energy in the electronic storage unit 130 to the power grid in response to controller 102 determining the electrical storage unit 130 has collected a predetermined amount of energy. In one implementation the predetermined amount of energy may be 90% of maximum charge. In one implementation, the electric power grid is disposed within a home or office building.

In one implementation, light sensor 120 continuously or periodically detect one or more shadows or sun obstructions on or adjacent to the mobile solar collecting device 100, and feeds a signal to the controller 102 via system sensor 104 indicating light sensor 120 detected one or more shadows. Controller 102 in response may direct the transport unit 127 to move the mobile solar collecting device 100 to another of a plurality of optimum solar collecting locations (See FIG. 2.)

Figure 2:
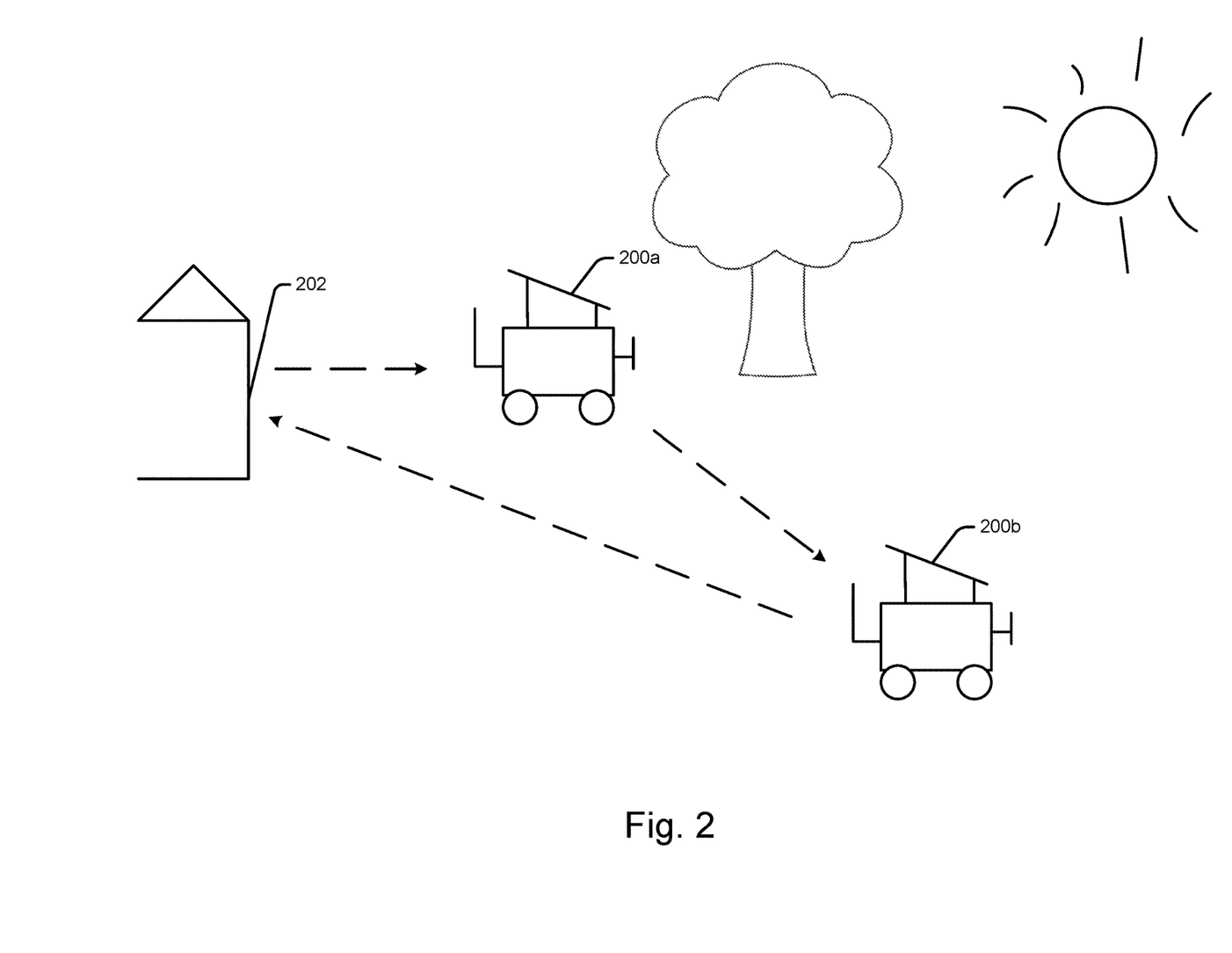
FIG. 2 is a system diagram of a mobile solar collection device in operation.

Referring to FIG. 2, there is shown a diagram of a mobile solar collection device 200a (device 100 in FIG. 1) in operation. During operation collection device 200a preferably is docked at a home location by plugging a connector on device 100 into another connector adjacent structure 202 (as further described herein). A controller 102 in collection device 200a directs a transport system of collection device 200a to move from the home location to one of a plurality of predetermined optimum solar collecting locations (see collection device 200b) in the yard away from the structure 202 to collect energy provided by a sun with the adjustable solar collecting device, e.g. solar panel 128. An orientation and/or angle of the adjustable solar collecting device 128 is adjusted to obtain maximum energy from a sun at the panel, and such energy is stored in the electronic storage unit 130. In one implementation, an angular orientation of the solar collection device 128 is changed with respect to a horizon to between 0 and 45 degrees. Solar energy collected by the mobile solar collecting device 200a and converted to electrical energy is stored with the electronic storage unit 130.

The light sensor within device 200a (periodically or continually) detects one or more shadows on or adjacent to the mobile solar collecting device 128 and provides the light indication to controller 102. In response, controller 102 automatically directs the transport unit to move the mobile solar collecting device 200a to another of many optimum solar collecting locations 200b that are free from obstructions between the solar collecting device 200b and the sun.

A sensor on collection device 200a automatically determines the battery 130 in solar collection device 200a has collected a predetermined amount of energy. In response, controller 102 send a signal/indication to direct the transport unit 127 to move the mobile solar collecting device 200b to a location (e.g. home location) where the power connector electrically engages with the power connector affixed to a structure to discharge energy in the electronic storage unit to the power grid. The power connector of collection device 200b electrically engages with a power connector affixed to a structure to feed electricity to a power grid (or a battery storage unit) within the building.

Example Controller Architecture

Figure 3:
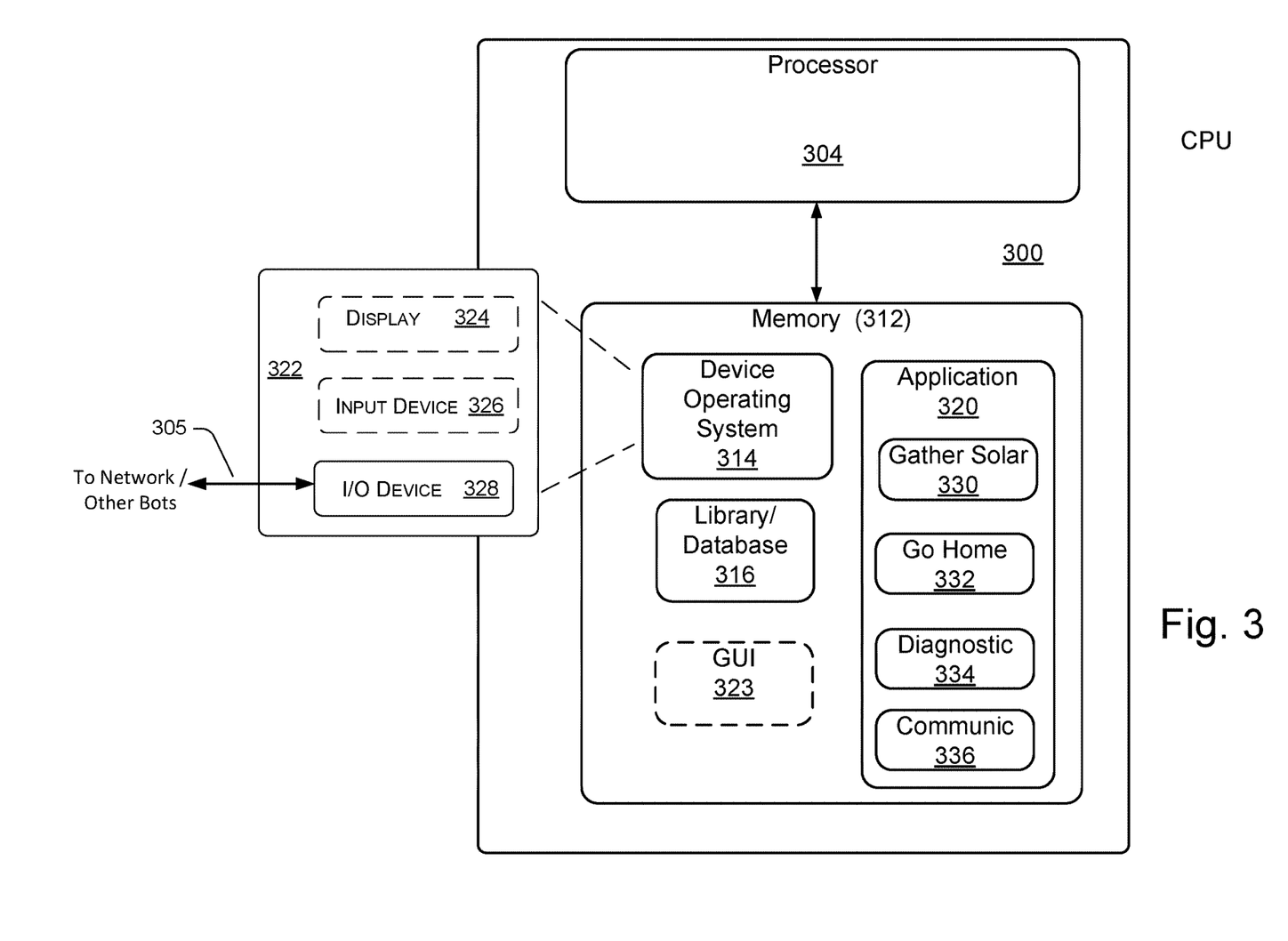
FIG. 3 is a simplified schematic diagram of an exemplary computing device in a controller for of the mobile solar collection device.

In FIG. 3 there are illustrated selected modules in controller device 300 (computing devices 102 of FIG. 1). Controller device 300 includes a processing device 304, memory 312, and display/input device 322. Processing device or processor 304 may include a microprocessor, microcontroller or any such device for accessing memory 312, and display/input device 322. Processing device 304 has processing capabilities and memory suitable to store and execute computer-executable instructions. In one example, processor 304 includes one or more processors.

Sensors controllers and devices shown in FIG. 1 connect to I/O device 322 directly via a wire or wirelessly.

Processing device 304 executes instructions stored in memory 312, and in response thereto, processes signals from display/input device 322. Display/Input device 322 receives wireless inputs from a user of server/mobile device (not shown) or another solar collection device (not shown). Display device 208 may include an LED (Light emitting diode), LCD (Liquid crystal display), CRT (cathode ray tube) or any type of display device.

Memory 312 may include volatile and nonvolatile memory, removable and non-removable media implemented in any method or technology for storage of information, such as computer readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium (including a non-transitory computer readable storage medium) which can be used to store the desired information and which can be accessed by a computer system.

Modules stored in memory 312 of the controller device 300 may include an operating system 314, a library database 316, a controller application 320 and a graphical user interface 323. Operating system 314 may be used by application 320 to operate device 300. Library 316 may include preconfigured parameters (or set by the user before or after initial operation) such as the controller operating parameters and configurations. Application 320 may include a Gather Solar information module 330, a go home module 332, a diagnostic module 334, and a communication module 336. Details of these modules are described herein.

Figure 4:
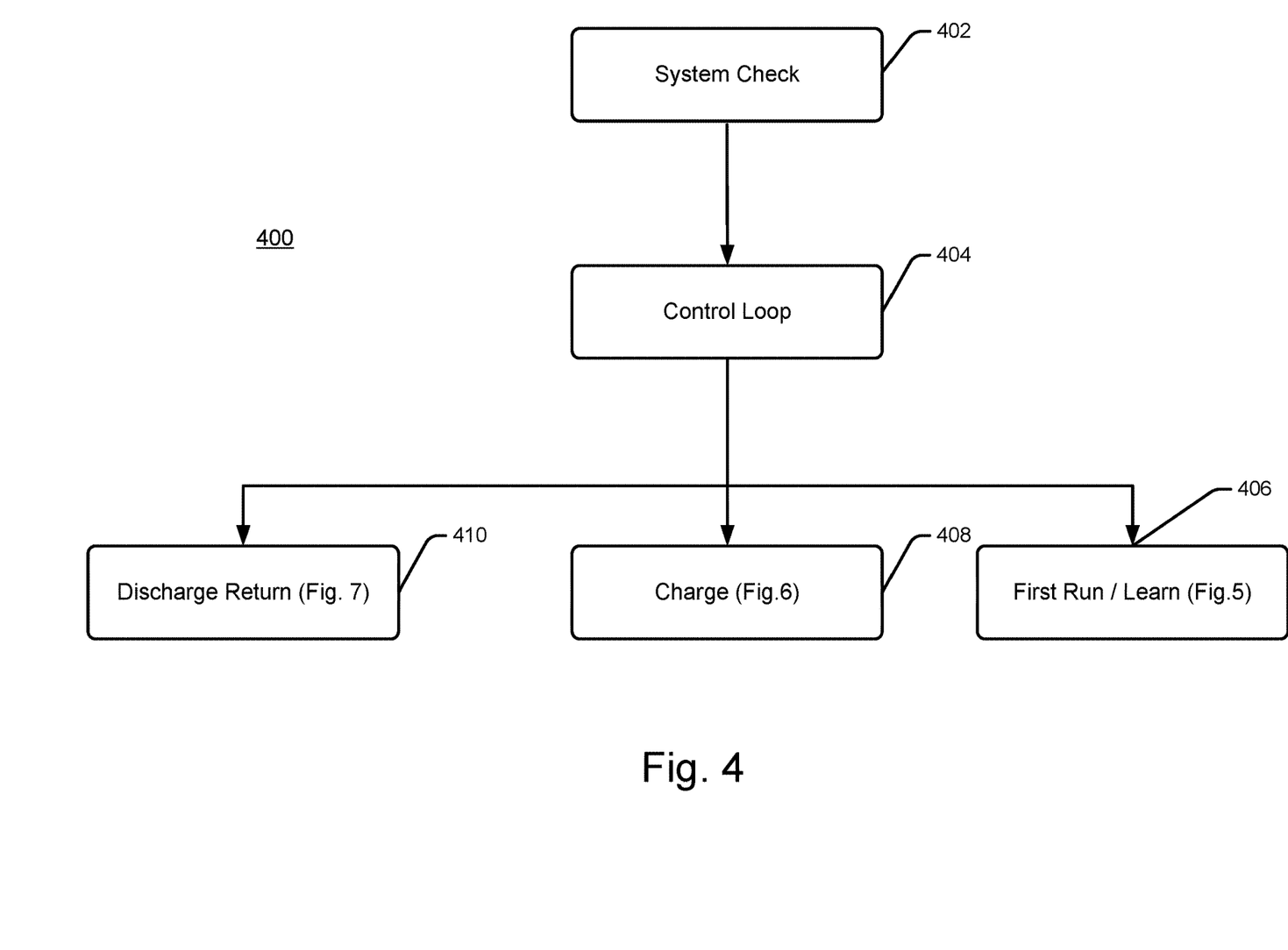
FIG. 4 illustrates a flow diagram of a process for collecting and discharging solar energy.

In FIG. 3 there are illustrated selected modules in controller device 300 (Solar panel controller 108 of FIG. 1) using process 400 shown in FIG. 4. Hosting device 300 includes a processing device 304, memory 312, and hardware 314. Processing device 304 may include one or more microprocessors, microcontrollers or any such devices for accessing memory 312 or hardware 314. Processing device 304 has processing capabilities and memory 312 suitable to store and execute computer-executable instructions.

Processing device 304 executes instruction stored in memory 312, and in response thereto, processes signals (e.g. binary logic levels) from hardware 322. Hardware 322 may include a display 324, and input device 326 and an I/O device 328. I/O device 328 may include a network and communication circuitry for communicating with sensors and controllers. Input device 326 receives inputs from a user of the host computing device or mobile device display device 324 may include an LED, LCD, CRT, or any type of display device.

Application 320 includes a Gather Solar information module 330, a go home module 332, a diagnostic module 334, and a communication module 336 module that are described in FIGS. 4-7 in process 400 for collecting and depositing solar energy. The exemplary process in FIGS. 4-7 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIG. 4-7, although it may be implemented in other system architectures.

Referring to FIG. 4, a flowchart of process 400 performed by processor 304 when executing the software instructions in application 320 is shown. Process 400 includes blocks 402-410. When application 320 is executed on the controller device 300, it uses the processor 304 and instructions in modules 330-336 that are shown in FIG. 3.

In the process 400, the controller device 300 (FIG. 3) in block 402 performs a system check to determine that all sensors and controllers (previously described) are operational. System check may check a battery charge level, monitor communications, check sensor working condition, and load maps.

In block 402, controller device 300 (See FIG. 3, also referred to herein as controller device 300) performs a control loop 404 to determine if the controller device 300 will conduct a first run in block 406, a charge operation in block 408, or a discharge operation in block 410. Such determination is based on the current or previous operating state of the controller device 300. If controller device 300 is in its initial operation, it performs the first run learn operation in block 406. If controller device 300 has performed its first run/learn operation it performs the charge operation in block 408 by directing the solar collector 200 (See FIG. 2) to an optimum location and collect energy from the sun. If the controller device 300 has determined that the battery has charged to a predetermined level, or that charging is no longer an option (due to weather, user preference or nighttime), controller device 300 performs a discharge/return operation in block 410. Control loop in block 404 may also include determining map completeness, time, weather, battery level, location, and system health.

In block 406, the controller device 300 does a first (initial) run/learn operation. Further details of this operation are described in FIG. 5.

In block 408, controller device 300 performs a charge operation. Further details of this operation are described in FIG. 6.

In block 410, controller device 300 performs a discharge return operation. Further details of this operation are described in FIG. 7.

Figure 5:
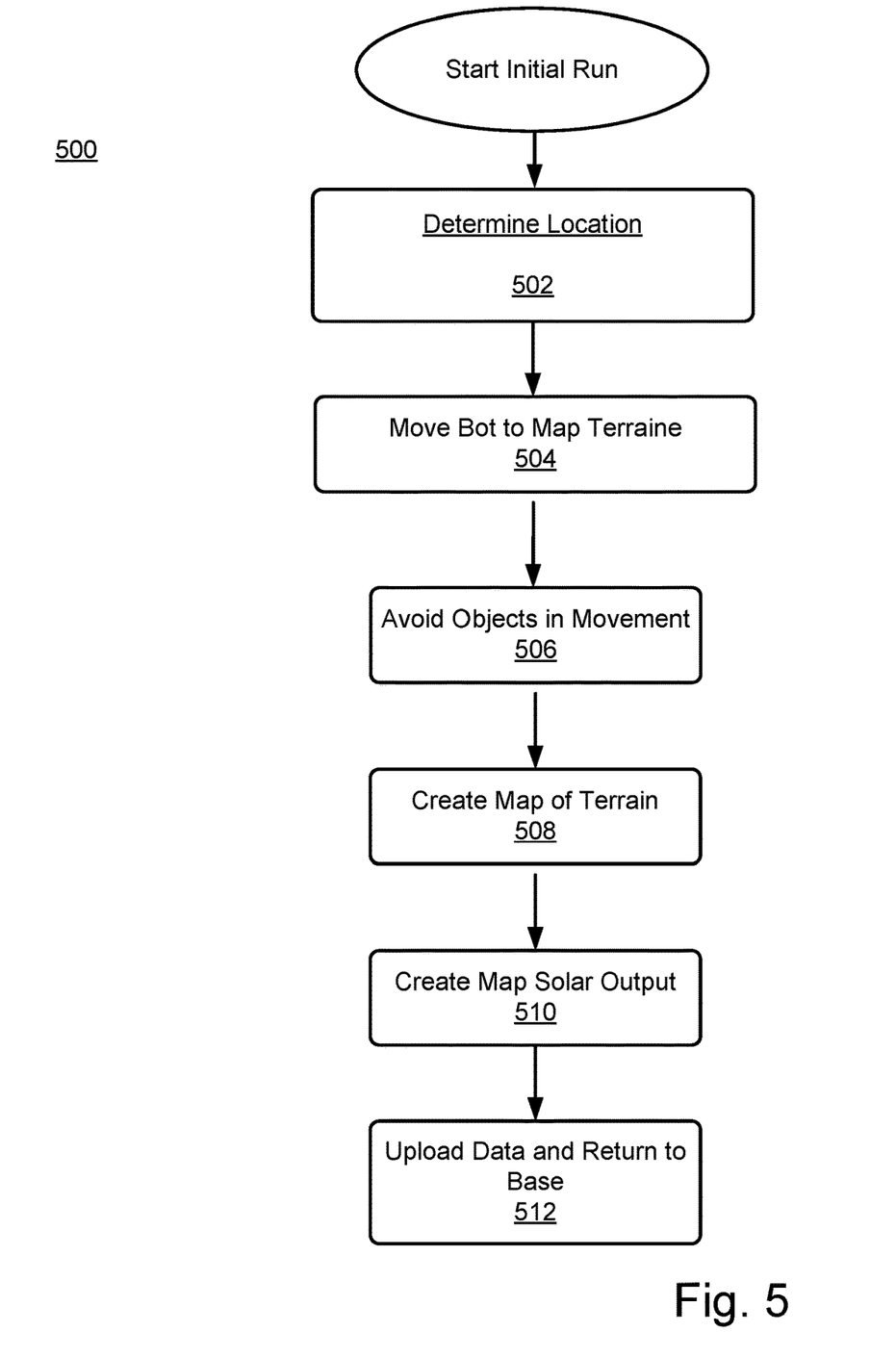
FIG. 5 illustrates a flow diagram of a first run process for collecting and discharging solar energy.

Referring to FIG. 5, a flowchart of process 500 performed by processor 304 when executing the software instructions in application 320 is shown. Referring to FIG. 5, there is shown the start initial run operation 500.

In block 502, controller device 300 determines it location by obtaining information from the GPS device. Controller device 300 may also perform a weather check and a calendar check.

In block 504, controller device 300 directs the transport unit 127 of the mobile solar collecting device 100 to map the terrain of the yard/area. The boundary of the yard may be pre-entered into the mobile solar collecting device from an external source.

In block 506, the controller device 300 avoids objects during the mapping process using a camera or vision sensor.

In block 508, the controller device 300 creates and stores a map of the terrain.

In block 510, the controller device 300 creates a map of solar conditions detected during the mapping.

In block 512, the controller device 300 uploads to the map and solar condition data to a backup storage device.

Figure 6:
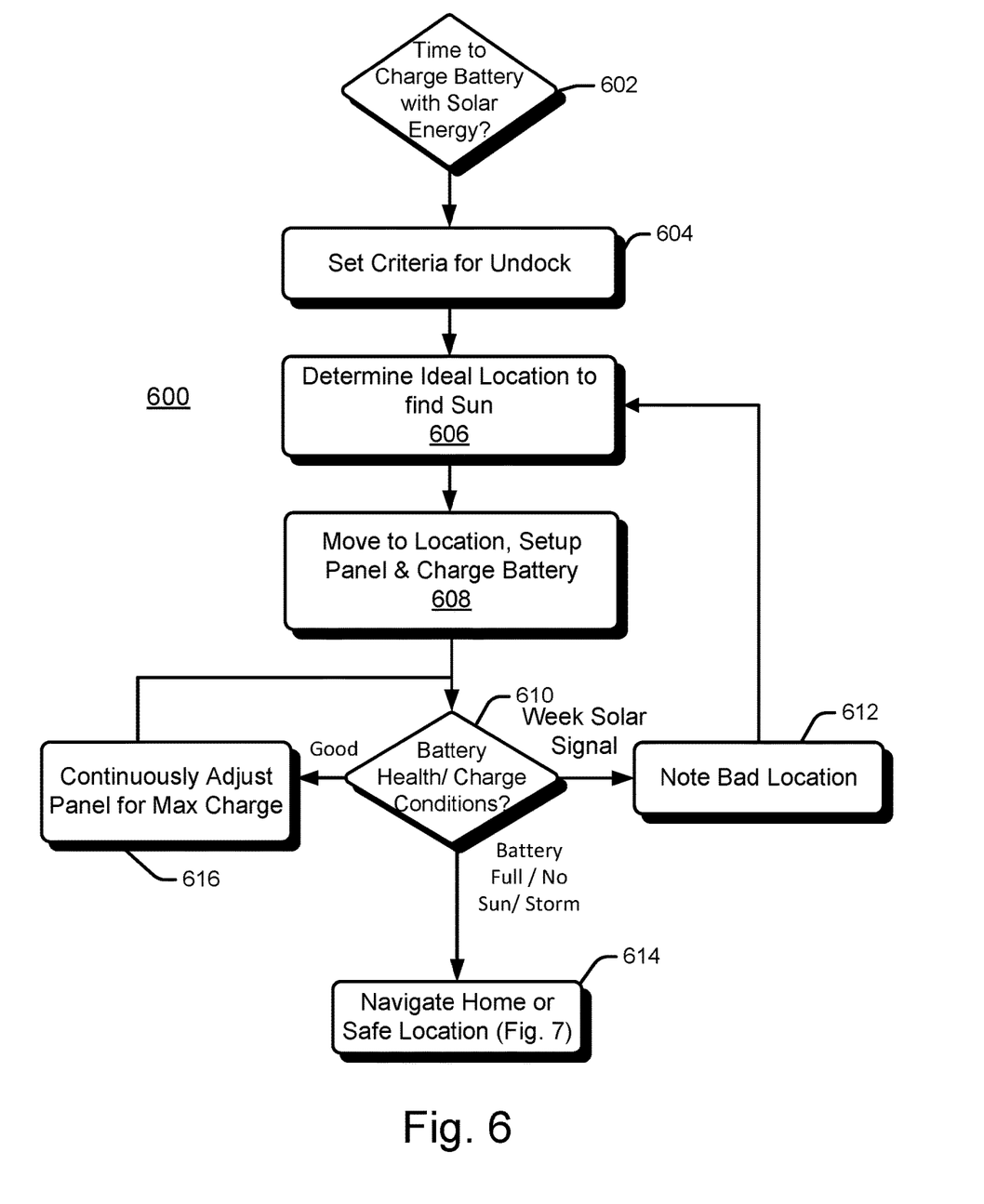
FIG. 6 illustrates a flow diagram of a charge/collection process for collecting and discharging solar energy.

Referring to FIG. 6, a flowchart of process 600 performed by processor 304 when executing the software instructions in application 320 is shown. Referring to FIG. 6, there is shown the charge operation 600.

In block 602, a determination is made by the controller device 300 if it is time to charge the battery with solar energy. Such a determination may be made based on whether, time of day and user preference.

In block 604, a criterion is used by controller device 300 to undock the mobile solar collecting device 100 from a connector at the structure. Such criteria may be set based on time of day and/or time of year, weather, a command from a user, a signal from a server, or a signal from a controller on another solar collecting device.

In block 606, controller device 300 determines the ideal/optimal location to obtain sun. The controller device 300 may use one or more of the prior stored maps, longitudinal/latitudinal GPS information, solar map, whether reports, time of year and time of day information to obtain this optimum location.

In block 608, the controller device 300 direct the transport system to the optimal location, sets up the solar panel with the correct angle and starts to charge the battery using solar energy collected from the solar panel.

In block 610, the controller device 300 determines the health, rate and change of conditions of the battery charging. If the health/battery charging rate is good (but not best), the angle of the panel can be adjusted by controller in block 616 to receive a maximum charge from the sun. If the controller device 300 determines health/battery charging rate is weak, the controller will note that the location may need to be changed and then the controller device 300 executes block 606 to determine an optimum location.

If the controller device 300 in block 614 determines that the battery is full or that conditions are not ideal for charging (based on a predetermined criteria—time of day, bad weather), the controller device 300 in block 614 navigates the solar collecting device 100 home (See FIG. 7) or to a predetermined safe location.

Figure 7:
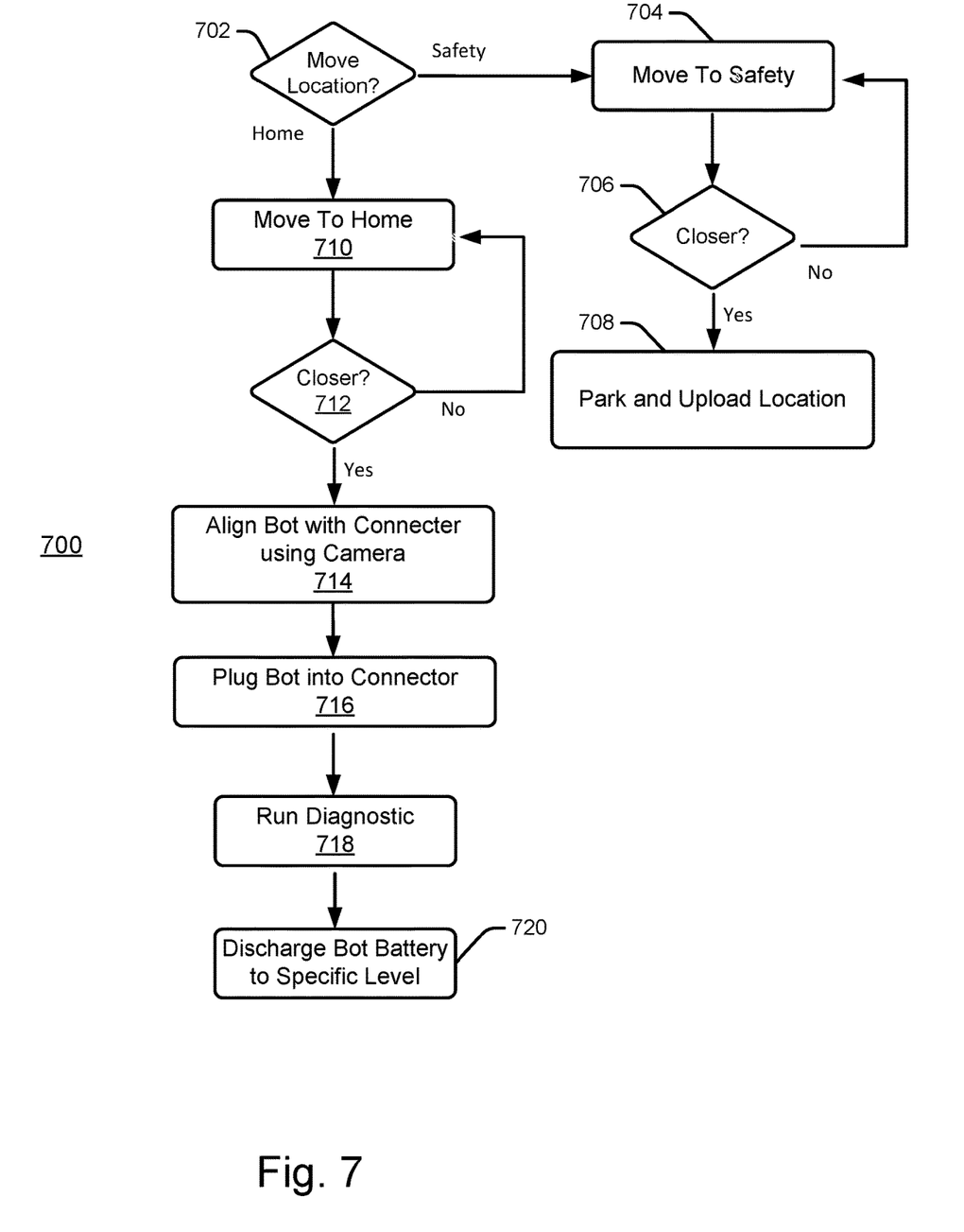
FIG. 7 illustrates a flow diagram of a process for collecting and discharging solar energy.

Referring to FIG. 7, a flowchart of process 700 performed by processor 304 when executing the software instructions in application 320 is shown. Referring to FIG. 7, there is shown the discharge return operation 700.

In block 702, controller device 300 determines if the mobile solar collecting device should move home or if not move to a safe location. If the collecting device 100 should move to a safe location then in block 704, controller device 300 directs the collecting device to move to the closest predetermined safe location.

In block 706 controller device 300 using monitoring sensors (see FIG. 1) determines if the collecting device 100 is closer to the safe location. If it is not, the controller device 300 sends a signal to direct the collecting device 100 to move in block 704. If the collecting device 100 has reached the safe location, in block 708 the controller device 300 directs the collecting device 300 to park and transmits its location to a remote device.

If controller determines that the collecting device 300 should move home, in block 710, controller device 300 directs the transport unit to move collecting device 100 toward home.

In block 712 controller device 300 using by monitoring sensors (see FIG. 1) determines if the collecting device 100 is closer to the home location. If the collecting device 100 is not closer, the controller device 300 directs the collecting device 100 to move in block 710.

In block 714, the controller device 300 directs the power connector to align with the power connector on the home structure using the camera.

In block 716, the controller device 300 directs the collecting device power connector to plug into the power connector on the home structure using the camera.

In block 718, the controller device 300 runs a diagnostic to ensure a proper connection and all discharge circuitry of the collecting device 100 is operating within correct limits.

In block 720, the controller device 300 directs the battery controller to discharge the battery to a predetermined level by offloading energy in the battery to the power grid/home battery.

Referring to FIGS. 8A-C and FIG. 9 there is shown a front side view, right side view, top side view, and top view without the solar panel 804 attached to the collecting device 800 (device 900 in FIG. 9) respectively. Collecting device 800 includes a sensor array 802 (camera, distance sensor, solar sensor, mapping array and GPS detector). Collecting device 800 may also include a solar panel 804, track assembly 806 (also referred to as transport assembly), and chassis 808. Connected to chassis 808 is lift arm 810, which controls the angular lean and angle with respect to the horizon of solar panel 804.

Figure 9:
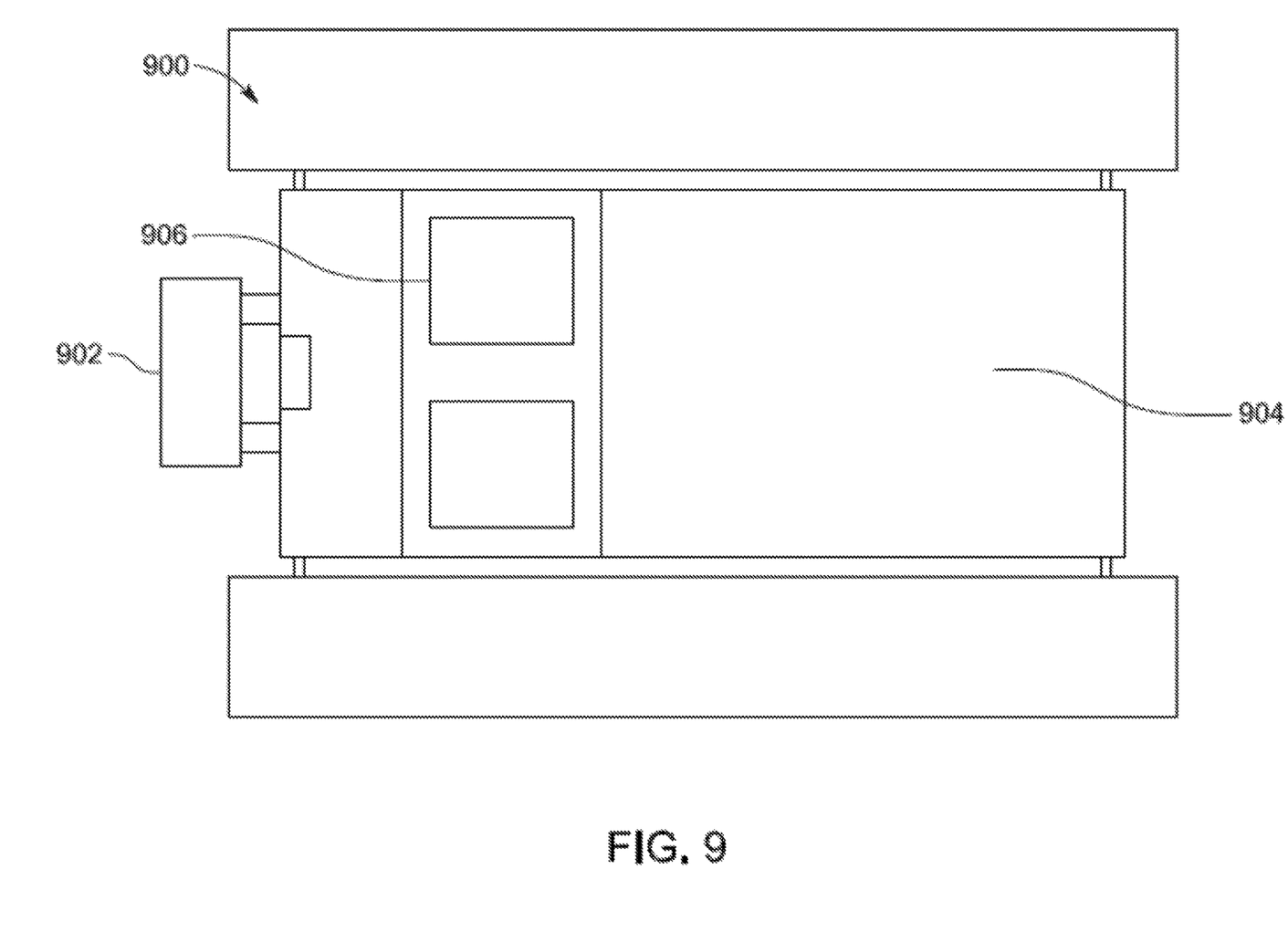
FIG. 9 is a top perspective view with a solar panel removed of the device for collecting and discharging solar energy.

Referring to FIG. 9, collecting device 900 includes discharge port 902 coupled with battery 904 and control unit 906 (controller device 300 described previously).

Figure 10A:
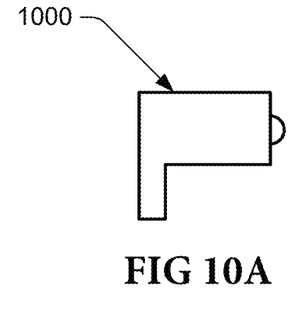
FIGS. 10A and 10B are side and perspective view of the solar panel power connector.
Figure 10B:
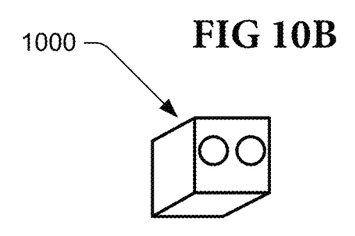
Figure 10C:
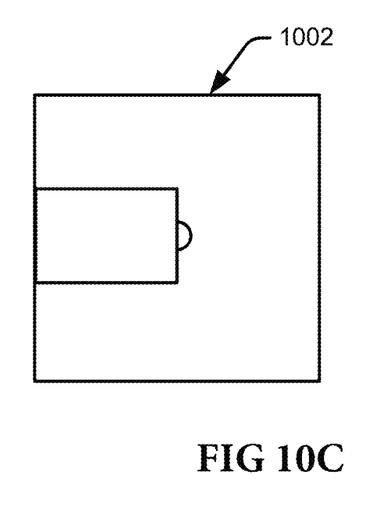
FIG. 10C is a side view of the building power connector that receives the solar panel power connector.

Referring to FIG. 10, there is shown an exemplary connector 1000 of discharge port 902 (FIG. 9) that mates with an exemplary receptacle 1002. Receptacle 1002 may be mounted to a home, dwelling, or building for transfer of electrical power discharged from battery 904 to a grid in the building.

Figure 11:
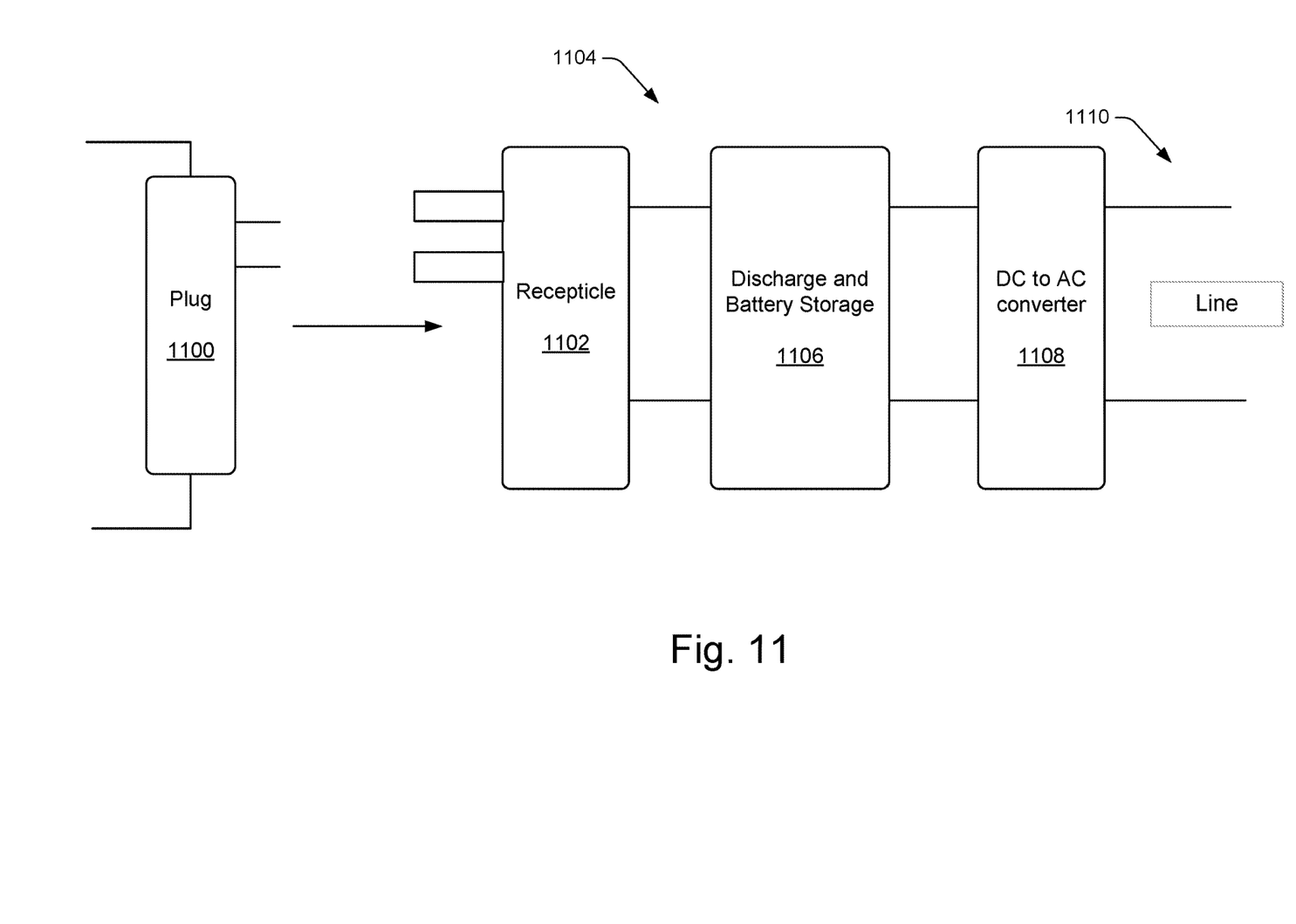
FIG. 11 is a simplified schematic diagram of the solar panel power connector coupling with the building electrical system.

Referring to FIG. 11, there is shown an exemplary solar panel power connector 1100 (also referred to herein as a plug) coupled with a receptacle 1102 of a building electrical grid 1104. Grid 1104 includes a discharge receive and battery storage circuitry 1106 coupled to a Direct Current (DC) to Alternating Current (AC) converter circuit 1108 coupled with the electrical system wiring/grid/line 1110 of a building (such as a home or an office building).

During a discharge operation, the plug 1100 of the collecting device (e.g. device 100 in FIG. 1) couples with receptacle 1102. Electrical power is discharged from collecting device through receptacle 1102 to discharge and storage circuitry 1104 where the electrical energy may be stored. The electrical energy may then be converted from DC to AC using converter circuit 1108 and then fed to grid/line 1110. The controller device 300 (control unit 906) may stop the discharge operation of collecting device 800 to ensure that the battery 904 (previously storage unit 130) does not completely discharge.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion but should be defined by the appended claims.

What is claimed is:

1. A mobile solar collecting device comprising:
an orientation adjustable solar panel;
an electronic storage unit to store electric energy collected by the orientation adjustable solar panel;
a first power connecter, electrically coupled with the electronic storage unit, to electrically engage with a second power connector affixed to a permanent structure to distribute electricity to an electric power grid;
a transport unit to move the orientation adjustable solar panel; and
a controller to direct the transport unit to move the orientation adjustable solar panel to one of a plurality of optimum solar collecting locations, to adjust an orientation angle of the orientation adjustable solar panel to obtain maximum energy from a sun to store in the electronic storage unit, and to direct the transport unit to move the orientation adjustable solar panel to a location where the first power connector electrically engages with the second power connector to discharge energy from the electronic storage unit to the electric power grid.

2. The mobile solar collecting device as recited in claim 1, wherein the electric power grid is disposed within a building.

3. The mobile solar collecting device as recited in claim 1, wherein the transport unit includes one or more motorized wheels or a half track.

4. The mobile solar collecting device as recited in claim 1, wherein the controller is operable to provide an indication to the transport unit to move the orientation adjustable solar panel away from the structure to one of the plurality of predetermined optimum solar collecting locations in a yard of a home or an office.

5. The mobile solar collecting device as recited in claim 1, wherein the controller directs the transport unit to move the orientation adjustable solar panel to another the plurality of optimum solar collecting locations that are free from obstructions between the another of the plurality of optimum solar collecting locations and the sun.

6. The mobile solar collecting device as recited in claim 1 further comprising a light sensor to detect one or more shadows on or adjacent to the orientation adjustable solar panel, and to feed a signal to the controller to direct the transport unit to move the orientation adjustable solar panel to another of the plurality of optimum solar collecting locations in response to detecting the one or more shadows.

7. The mobile solar collecting device as recited in claim 1, wherein the controller is operative to adjust the orientation of the orientation adjustable solar panel by changing an angular orientation of the orientation adjustable solar panel with respect to a horizon.

8. The mobile solar collecting device as recited in claim 1, wherein the controller directs the transport unit to move the orientation adjustable solar panel to a location where the first power connector electrically engages with the second power connector to discharge energy in the electronic storage unit to the power grid in response to determining that the electrical storage unit has collected a predetermined amount of energy.

9. A method for collecting and storing solar energy with a mobile solar collection device that includes an adjustable solar collecting device, an electronic storage unit, a first power connecter, a transport unit, and a controller, the method comprising:
   collecting energy provided by a sun with the adjustable solar collecting device;
   storing electric energy collected by the mobile solar collecting device with the electronic storage unit;
   directing the transport unit with the controller to move the adjustable solar collecting device to one of a plurality of predetermined optimum solar collecting locations;
   adjusting an angular orientation of the adjustable solar collecting device to obtain maximum energy from a sun to store in the electronic storage unit;
   directing the transport unit to move the mobile solar collecting device to a location where the power connector electrically engages with a second power connector affixed to a structure; and
   electrically engaging the first power connecter with a second power connector affixed to a structure to discharge stored electricity from the electronic storage unit to a power grid electrically coupled with the second power connector.

10. The method for collecting and storing solar energy as recited in claim 9, wherein directing the transport unit with the controller to move the adjustable solar collecting device to one of a plurality of optimum solar collecting locations includes directing the transport unit with the controller to move the adjustable solar collecting device away from the structure to one of a plurality of predetermined optimum solar collecting locations in a yard of a home or office.

11. The method for collecting and storing solar energy as recited in claim 9, wherein directing the transport unit with the controller to move the adjustable solar collecting device to one of a plurality of predetermined optimum solar collecting locations includes:
   directing the transport unit with the controller to move the adjustable solar collecting device to one of a plurality of predetermined optimum solar collecting locations that are free from obstructions between the solar collecting device and the sun.

12. The method for collecting and storing solar energy as recited in claim 9, further comprising detecting with a light sensor coupled with the controller one or more shadows on or adjacent to the adjustable solar collecting device, and directing with the controller the transport unit to move the mobile adjustable collecting device to another of a plurality of optimum solar collecting locations in response to detecting the one or more shadows.

13. The method for collecting and storing solar energy as recited in claim 9, wherein adjusting an orientation of the adjustable solar collecting device includes changing an angular orientation of the adjustable solar collection device with respect to a horizon.

14. The method for collecting and storing solar energy as recited in claim 9, wherein directing the transport unit to move the adjustable solar collecting device to a location where the first power connector electrically engages with the second power connector affixed to a structure to discharge energy stored in the electronic storage unit to the power grid includes:
   directing the transport unit to move the mobile solar collecting device to a location where the first power connector electrically engages with the second power connector affixed to a structure to discharge energy stored in the electronic storage unit to the power grid in response to the controller determining the electronic storage unit has collected predetermined amount of energy.

15. The method for collecting and storing solar energy as recited in claim 9 further comprising electrically engaging the first power connector coupled with the mobile solar collection device with the second power connector affixed to a permanent structure to discharge energy stored in the electronic storage unit to the power grid.

16. A system for collecting and storing solar energy comprising:
   a building including an internal power grid;
   a building power connector affixed to a structure and electrically coupled with the internal power grid;
   a first mobile solar collecting device including:
   an angle adjustable solar panel to collect solar energy from a sun;
   an electronic storage unit to store electric energy collected by the adjustable solar panel;
   a first power connecter coupled with the electronic storage unit to electrically engage with the building power connector to discharge stored electrically energy from the electronic storage unit to the power grid;
   a motorized transport unit to move the adjustable solar panel; and a controller to direct the transport unit to move the first mobile solar collecting device away from the structure to one of a plurality of predetermined optimum solar collecting locations free from obstructions between the adjustable solar panel and the sun, to provide a signal to adjust an orientation of the adjustable solar panel, to direct the transport unit to move the first mobile solar collecting device to a location where the first power connector electrically engages with the second power connector to discharge energy stored in the electronic storage unit to the power grid.

17. The system as recited in claim 16 wherein the controller provides the signal to adjust the angular orientation of the adjustable solar panel with respect to a horizon to obtain maximum energy from the sun to store in the electronic storage unit.

18. The system as recited in claim 16 wherein the controller periodically changing the angular orientation of the adjustable solar panel with respect to the horizon to obtain maximum energy from the sun to store in the electronic storage unit, in response to at least one of a command signal from an operator, a weather indication, a sunlight indication or a time of day indication.

19. The system as recited in claim 16 further comprising a light sensor to detect one or more shadows on or adjacent to the adjustable solar panel, and to provide an indication signal to the controller to direct the transport unit to move the adjustable solar panel to another of a plurality of optimum solar collecting locations in response to the light sensor detecting the one or more shadows.

20. The system as recited in claim 16 further comprising a second mobile solar collecting device having a second adjustable solar panel, an electronic storage unit, a power connecter, a transport unit, and a second controller, the second controller in electronic communication with the controller of the first mobile solar collecting device to direct the transport unit of the second mobile solar collecting device to move the second mobile solar collecting device away from the first mobile solar collecting device to another one of the plurality of predetermined optimum solar collecting locations free from obstructions between an adjustable solar panel of the second mobile solar collection device and the sun.

* * * * *